US010293961B2

(12) United States Patent
Stamm Kristensen

(10) Patent No.: US 10,293,961 B2
(45) Date of Patent: May 21, 2019

(54) METHOD AND MODULAR, MOBILE MIXING AND PACKAGING PLANT

(71) Applicant: INVERSIONES HIKI6, S.L., San Ginés, (Murcia) (ES)

(72) Inventor: Henrik Stamm Kristensen, San Ginés (ES)

(73) Assignee: INVERSIONES HIKI6, S.L., San Ginés (Murcia) (ES)

( * ) Notice: Subject to any disclaimer, the term of this patent is extended or adjusted under 35 U.S.C. 154(b) by 86 days.

(21) Appl. No.: 15/403,803

(22) Filed: Jan. 11, 2017

(65) Prior Publication Data
US 2017/0203858 A1 Jul. 20, 2017

(30) Foreign Application Priority Data

Jan. 20, 2016 (EP) ..................................... 16382020

(51) Int. Cl.
| | |
|---|---|
| *B65B 1/04* | (2006.01) |
| *A23N 17/00* | (2006.01) |
| *B65B 3/04* | (2006.01) |
| *B65B 3/26* | (2006.01) |
| *B65B 5/00* | (2006.01) |
| *B65B 39/00* | (2006.01) |
| *B65B 57/00* | (2006.01) |
| *B65G 63/00* | (2006.01) |
| *B65B 65/00* | (2006.01) |
| *B65B 1/00* | (2006.01) |

(52) U.S. Cl.
CPC .............. *B65B 1/04* (2013.01); *A23N 17/007* (2013.01); *B65B 3/04* (2013.01); *B65B 3/26* (2013.01); *B65B 5/00* (2013.01); *B65B 39/00* (2013.01); *B65B 57/00* (2013.01); *B65B 65/00* (2013.01); *B65G 63/00* (2013.01); *B65B 1/00* (2013.01)

(58) Field of Classification Search
CPC .... B65B 1/00; B65B 1/04; B65B 3/04; B65B 3/26; B65B 65/00; B65B 63/00; B65B 5/00; B65B 39/00; B65B 57/00; A23N 17/007

See application file for complete search history.

(56) References Cited

U.S. PATENT DOCUMENTS

| | | | | |
|---|---|---|---|---|
| 3,058,272 A * | 10/1962 | Huber | ..................... | B65B 61/28 53/138.5 |
| 4,563,858 A * | 1/1986 | Van Der Wal | ....... | B65G 63/008 414/141.6 |
| 5,656,491 A * | 8/1997 | Cassani | ................... | B01J 19/004 422/129 |
| 5,944,420 A * | 8/1999 | Petit | ................... | B01F 15/00928 366/349 |
| 6,331,070 B1 * | 12/2001 | Desai | ....................... | B01F 7/162 366/197 |
| 6,622,063 B1 * | 9/2003 | Moritz | ................... | B65D 90/00 700/231 |
| 6,827,477 B2 * | 12/2004 | Chszaniecki | ............. | B29B 7/58 366/100 |

(Continued)

*Primary Examiner* — Nicolas A Arnett
(74) *Attorney, Agent, or Firm* — Arent Fox LLP

(57) ABSTRACT

The present invention relates to a modular, mobile mixing and packaging plant for powdery or granular products comprising a carrying structure having dimensions suitable for being introduced in a standard maritime container and internally housing a reception and manual weighing module, a material loading module, a mixing module and a packaging module.

9 Claims, 5 Drawing Sheets

(56) References Cited

U.S. PATENT DOCUMENTS

| | | | |
|---|---|---|---|
| 9,010,073 B2 * | 4/2015 | Stamm Kristensen | ........................ A23N 17/007 141/10 |
| 2006/0231295 A1 * | 10/2006 | Yamaguchi | ............... B65B 1/32 177/25.18 |
| 2009/0320957 A1 * | 12/2009 | Jorgensen | ............ B67D 7/0498 141/94 |
| 2012/0151877 A1 * | 6/2012 | Stamm Kristensen | ........................ A23N 17/007 53/411 |
| 2015/0336689 A1 * | 11/2015 | Brown | ..................... B65B 3/12 141/98 |

* cited by examiner

METHOD AND MODULAR, MOBILE MIXING AND PACKAGING PLANT

CROSS-REFERENCE TO RELATED APPLICATION

This application claims the benefit of priority to European Patent Application No. 16382020.2, filed Jan. 20, 2016. The disclosure of the prior application is hereby incorporated in its entirety by reference.

TECHNICAL FIELD

The object of the present invention is a method and a modular and easily transportable plant intended for dosing, mixing and packaging powdery products, granular products and other products having similar characteristics and comprising a carrying structure incorporating a plurality of modules interacting with one another to obtain a mixed and packaged product ready to be sold.

The present invention is comprised in the technical field of industrial plants for manufacturing, mixing and packaging powdery products such as those used in the agri-food industry, without this limiting the application thereof to other products having similar characteristics in other industrial manufacturing sectors.

PRIOR ART

Conventionally, in plants and machines for mixing powdery products different processing phases the product to be mixed goes through in the vertical direction, i.e., the product goes from one phase to another due to gravity, from the upper part of the plant to the lower part, are described, as is described, for example, in Spanish patent document with application number P0381423, which describes a machine for treating or mixing powdery products, granular products or doughy products.

To solve this problem, European patent document EP2465780 describes a mobile dosing, mixing and packaging plant which, as it can be a mobile plant capable of dosing, mixing and packaging powdery products, granular products or the like, can be transported in a certified maritime transport container measuring 40 feet, and where its entire structure, including all the necessary machinery, elements and tools, are distributed horizontally. Furthermore, this document describes a mobile plant the operative control of which is done remotely, assuring complete control over the product and the traceability thereof, being provided with real time connection with a control center arranged for such purpose in another location other than that of the mobile plant itself.

DISCLOSURE OF THE INVENTION

An object of the present invention is a method and a modular mobile plant which, based on concept described in patent document EP2465780, improves its functionality and modularity such that possible uses thereof and, therefore, the versatility thereof, are increased.

Therefore, on a modular, mobile mixing and packaging plant for powdery or granular products comprising a carrying structure having dimensions suitable for being introduced in a standard maritime container and internally housing a reception and manual weighing module, a material loading module, a mixing module and a packaging module, where there are incorporated automatic dosing modules for the automatic dosing prior to introducing the formula and furthermore incorporating an automatic formula loading module with an automatic bag opening system for automating the loading of raw material into the plant.

Furthermore, the mobile plant also incorporates a liquid injection module for injecting liquids into a powder mixture, maintaining a final powder state. The module is automated, such that it is possible to automatically dose the liquids into the mixture, up to ten liquids, according to what is previously required by the end user, with the ability to inject up to 50% liquid into the powder such that the powdery form is maintained after the injection with the conditions and parameters required by the final formulation, such as temperature, stirring and pre-mixture of liquids.

Finally, the plant incorporates a packaging module depending on the type of packaging the end user requires, including, in a non-limiting manner, a big bag filling module, a European type bag filling module or a module for filling any other type of enclosure (such as sachets, for example). Furthermore, the packaging module can incorporate an automatic palletizing module for any client needing end of line automation.

In all the described modules a series of basic conditions are met to assure compatibility with the plant as a whole, because all the modules must be transportable in a maritime transport container measuring 20 or 40 feet, depending on the type of module, with all the necessary machinery, auxiliary elements and tools included.

In addition, the modules must be connectable plug and play type modules, i.e., they must be able to be connected with the CPU managing the plant as a whole for immediate use, which includes that the modules must be compatible both electrically and pneumatically.

All this is as described in the different aspects indicated in the independent claims attached hereto and incorporated in this description by reference to same. Likewise, the dependent claims show particular practical embodiments of the invention, also being incorporated herein by reference to same.

Throughout the description and claims the word "comprises" and variants thereof do not seek to exclude other technical features, additives, components or steps. For the persons skilled in the art, other objects, advantages and features of the invention will depend in part on the description and in part on putting the invention into practice. The following examples and drawings are provided by way of illustration and are not intended to limit the present invention. Furthermore, the present invention covers all the possible combinations of particular and preferred embodiments herein indicated.

BRIEF DESCRIPTION OF THE DRAWINGS

A series of drawings which help to better understand the invention and which are expressly related to an embodiment of said invention presented as a non-limiting example thereof is very briefly described below.

DETAILED DESCRIPTION OF AN EMBODIMENT OF THE INVENTION

Figure 1:
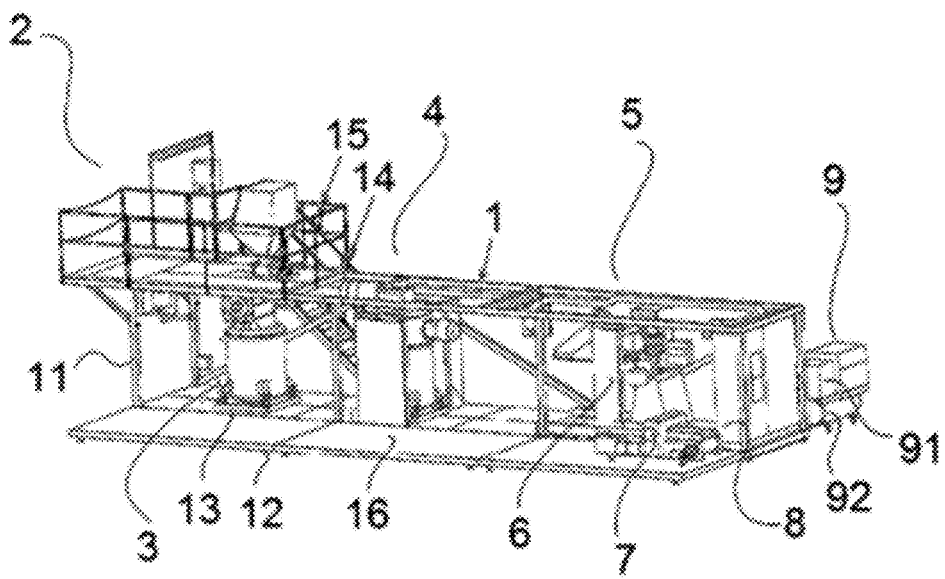
FIG. 1 shows a perspective view of the mobile mixing plant for powdery products and of its carrying structure as described in patent document EP2465780.
Figure 2:
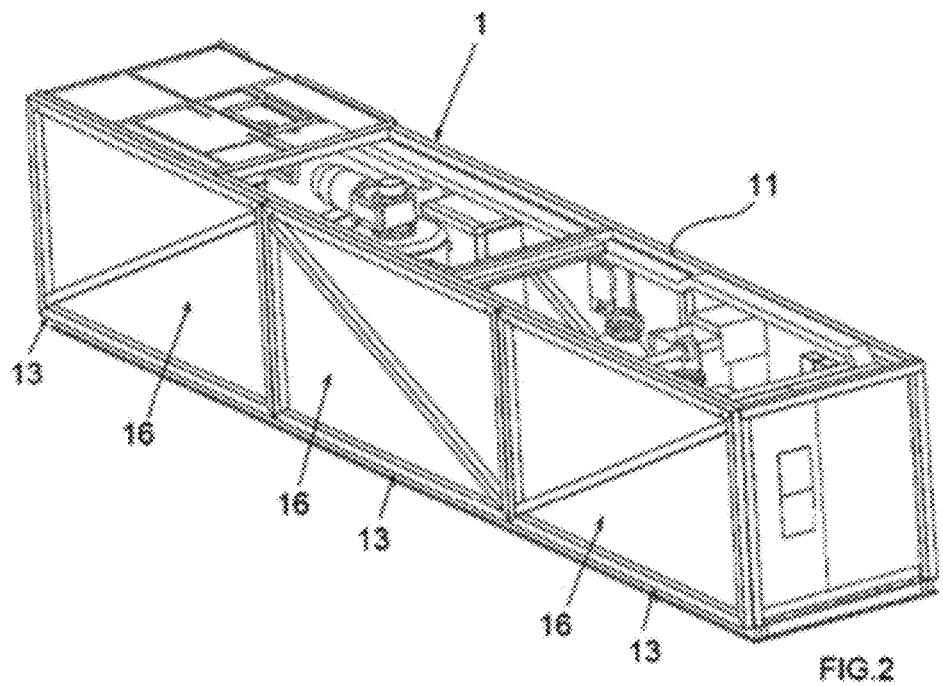
FIG. 2 shows the plant of FIG. 1 in the transport position.
Figure 3A:
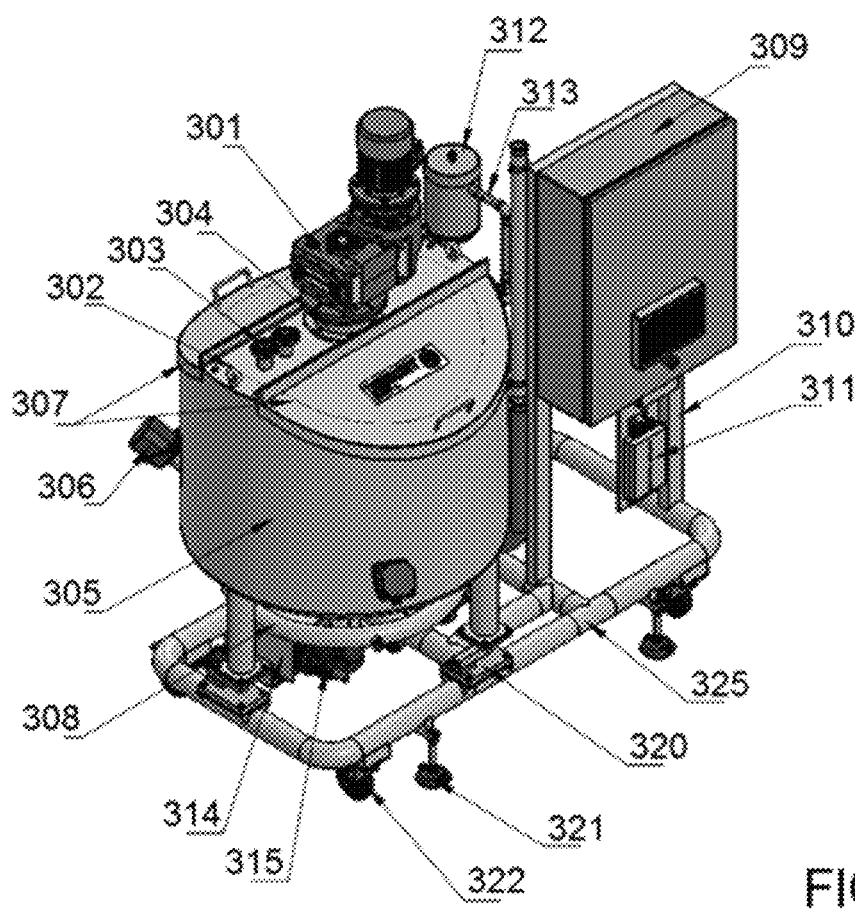
FIG. 3A shows an isometric view of a liquid injection module which is connected with the mobile mixing plant for powdery products of FIG. 1.
Figure 3B:
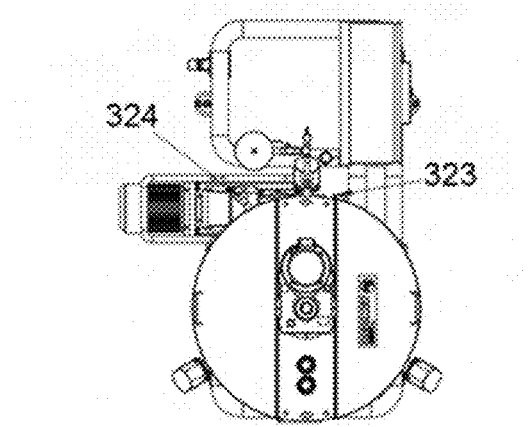
FIG. 3B shows a plan view of a liquid injection module which is connected with the mobile mixing plant for powdery products of FIG. 1.
Figure 3C:
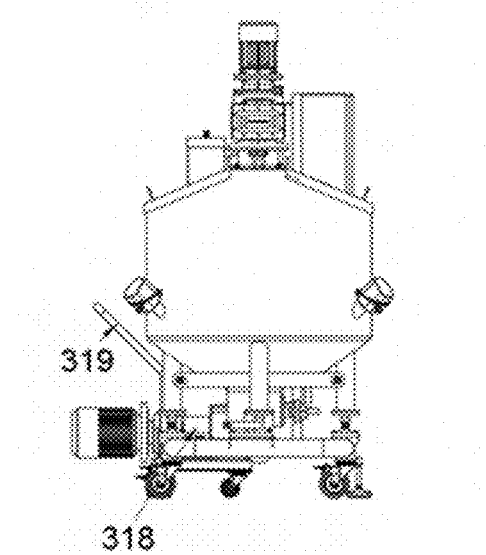
FIG. 3C shows an elevational view of a liquid injection module which is connected with the mobile mixing plant for powdery products of FIG. 1.
Figure 3D:
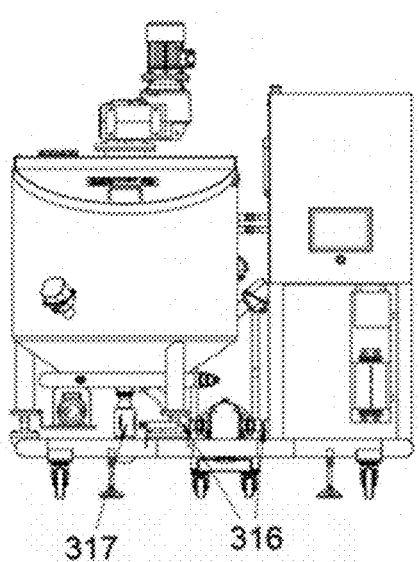
FIG. 3D shows a profile view of a liquid injection module which is connected with the mobile mixing plant for powdery products of FIG. 1.
Figure 3E:
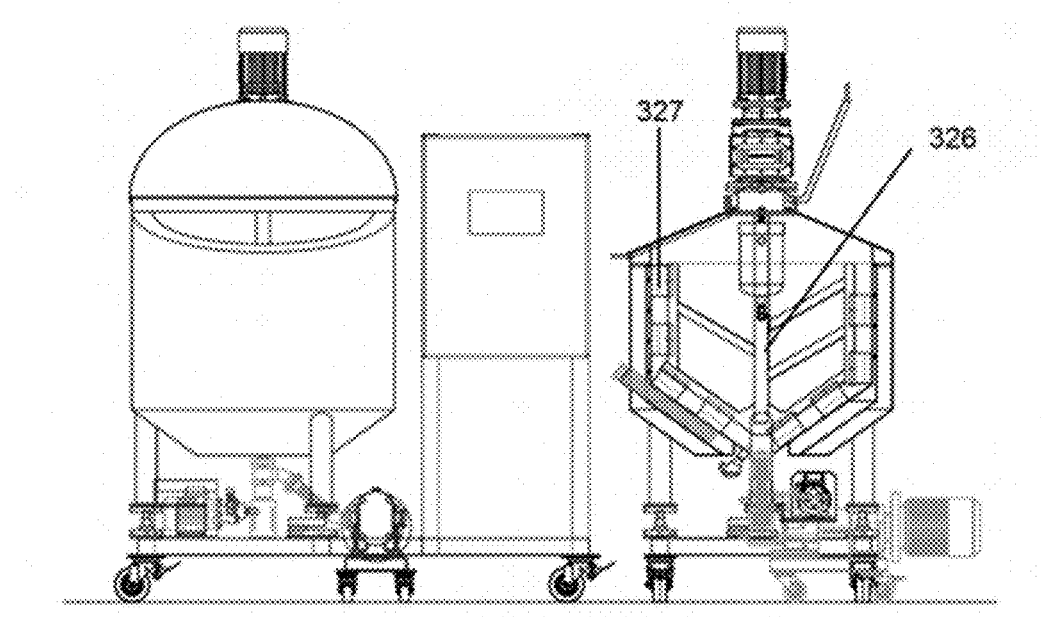
FIG. 3E shows an internal view of a liquid injection module which is connected with the mobile mixing plant for powdery products of FIG. 1.

As can be seen in FIG. 1, the modular mobile plant object of the present invention essentially comprises a carrying structure (1) and a reception and weighing area (2), a loading area (3), a mixing area (4), a packaging area (5), a sewing and labeling area (6), a metal detection area (7), a palletizing area (8) and a cleaning area (9).

The carrying structure (1) is formed by various square tubes (11) supported at several height-adjustable support points (12), several hinges (13) and a ladder (14) with a safety railing (15). This structure will have dimensions that are not larger than the measurements of a standard container measuring 40 inches, such that the total dimensions allow the transport thereof in a standard transport container (generally a maritime container measuring 40 feet).

In a practical embodiment, the structure (1) will be built with square stainless steel tube. The ground of the structure will be formed by rolled carbon steel profiles. The profiles and crossbeams of the structure will be made of square stainless steel tube. The structure (1) will be supported by six height-adjustable support points on which there is supported a diamond plate where objects and staff move about. One side (16) will fold in three sections and will also be built with square tube and diamond plate. The aforementioned hinges will fold the aforementioned sides using a number of capstans for easy installation and positioning.

The access ladder (14) will be built with stainless steel, except for the tread of the steps, which will also be built from stainless steel anti-skid plate. A rectangle will be arranged at the end of the ladder to provide access to the upper part of the platform. The top of the platform and access ladder have a protective railing (15) along the entire perimeter, built with square stainless steel tube.

The automatic dosing modules perform dosing prior to introducing the formula and furthermore incorporating an automatic formula loading module with an automatic bag opening system to automate the loading of raw material into the plant. These automatic dosing modules are connected in the reception and weighing module (2).

Furthermore, the mobile plant also incorporates a liquid injection module for injecting a liquid into a powder mixture (FIG. 3), maintaining a final powder state powder. The module is automated, such that it is possible to automatically dose the liquids into the mixture, up to ten liquids, according to what is previously required by the end user, with the ability to inject up to 50% liquid into the powder such that the powdery form is maintained after the injection with the conditions and parameters required by the final formulation, such as temperature, stirring and pre-mixture of liquids. This liquid injection module is connected with the stirring tank (41) in the mixing module (4).

More specifically, the liquid injection module (300) serves for dosing into the mixer liquid amounts of any viscosity by means of a pump (318), preferably a lobe pump, without ruling out pumps of any other type, where the flow rate is controlled by means of a plurality of loading cells (320). The liquid injection module performs the following phases during the process:

i. Loading the stirring tank (305) with the liquid or liquids making up the raw material.

ii. Stirring the liquid or liquids by means of an anchor-type stirrer (326, 327) incorporating scrapers. The stirring tank (305) maintains or achieves optimal temperatures due to its dual chamber with resistors and temperature control by means of at least one temperature probe (324).

iii. For controlling the amounts to be dosed, the tank (305) has a plurality of loading cells (320) commanding the pump (318), transferring the exact amounts required for the formula into the stirring tank (41) of the mixing module (4).

The liquids are homogenized by means of the stirrer (326, 327) because when there is more than one liquid, the exact amount with the same proportion of each ingredient must be previously homogenized and then dosed in that manner. The liquid injection capacity reaches up to a percentage of 50% (it will normally be a lower percentage) with respect to the powder such that the powdery form is maintained after the injection with the conditions and parameters required by the final formulation, such as temperature, stirring and pre-mixture of liquids.

As can be seen in the following table, the liquid injection module (300) comprises the following elements in the particular embodiment non-limiting shown in FIG. 3:

| Reference | Units | Characteristic |
| --- | --- | --- |
| 301 | 1 | Geared motor |
| 302 | 2 | Lifting loops |
| 303 | 2 | Liquid feed nozzles |
| 304 | 1 | Stirrer connection neck |
| 305 | 1 | Liquid compartment |
| 306 | 3 | 3000 W resistors |
| 307 | 2 | Covers of the compartment (305) |
| 308 | 1 | Tubular wiring structure |
| 309 | 1 | Main distribution board |
| 310 | 1 | Rectangular structure for board (309) |
| 311 | 1 | Control of loading cells (320) |
| 312 | 1 | Oil compartment |
| 313 | 1 | Oil circuit |
| 314 | 1 | Gear pump support (315) |
| 315 | 1 | Gear pump of the circuit (313) |
| 316 | 2 | Feed hose |
| 317 | 1 | Bottom valve of tank (305) |
| 318 | 1 | Pump |
| 319 | 1 | Mobile structure of the pump (318) |
| 320 | 3 | Loading cells |
| 321 | 4 | Height-adjustable base |
| 322 | 4 | Wheels of the structure |
| 323 | 1 | Safety sensor |
| 324 | 2 | Temperature probe |
| 325 | 1 | Tubular frame |
| 326 | 1 | Rotary support of the scraper |
| 327 | 8 | Scraper |

In a particular embodiment, the liquid compartment (305) or stirring compartment is a cylindrical type compartment with a frustoconical bottom and dual chamber prepared for introducing thermal oil distributing the heat of the resistors (306), which in this particular embodiment have a power of 3 kW each.

The compartment (305) has a hygienic gantry where there is supported an anchor scraper (326) with scrapers (327) that are made of white, food-grade plastic and that withstand service temperatures of 60° C. and peaks of up to 100° C. Furthermore, it comprises at least one cover (307) in the top part making cleaning and inspections easier, furthermore having a certain inclination as shown in FIG. 3.

The outlet for the product with a bottom sanitary valve (317). The upper openings will have safety sensors (323) in the two covers (307). Each of the supports of the compartment (305) has a loading cell (320) which allows the reading of the weight of the product.

The heating system performs the function of keeping the product at the desired temperature, if necessary, by means of a dual chamber around the compartment (305) in which the thermal oil will circulate and the resistors (306) will be installed. The outside of the compartment (305) is heat-insulated.

To load the thermal oil, the equipment has a compartment also acting as an expansion vessel. The oil enters the dual chamber of the tank where it is heated by means of thermal resistors (306). The outlet for the oil is located in the lower part, where there is a gear pump (315) that continuously recirculates the thermal oil while it is hot through the oil circuit (313).

Both the temperature of the product inside the compartment (305) and the temperature of the thermal oil are controlled by temperature probes (324).

The dosing system allows effectively dosing the product contained in the compartment (305) towards the mixing tank (41) of the mixing module of the plant of FIG. 1. The dosing is performed by means of a pump (318) controlled by a variable frequency drive. The inlet of the pump (318) is connected to the bottom valve (317) of the compartment (305) by means of a flexible and hygienic connection. The inlet of the pump (318) is always below the outlet of the bottom valve (317). The outlet of the pump is connected with a feed hose with a connection compatible with an inlet of the mixing tank (41) of the mixing module (4) of the plant of FIG. 1.

Finally, the frame is formed by a tubular structure 325 to prevent flat surfaces and therefore the accumulation of dirt and to make cleaning of all the surfaces easier. The structure incorporates wheels 322 with the possibility of fixing and height-adjustable feet 321 to provide stability to the assembly.

Finally, the plant incorporates a packaging module depending on the type of packaging required by the end user, including, in a non-limiting manner, a big bag filling module, a European type bag filling module or a module for filling any other type of enclosure (such as sachets, for example). Furthermore, the packaging module can incorporate an automatic palletizing module for that client needing end of line automation.

Figure 4:
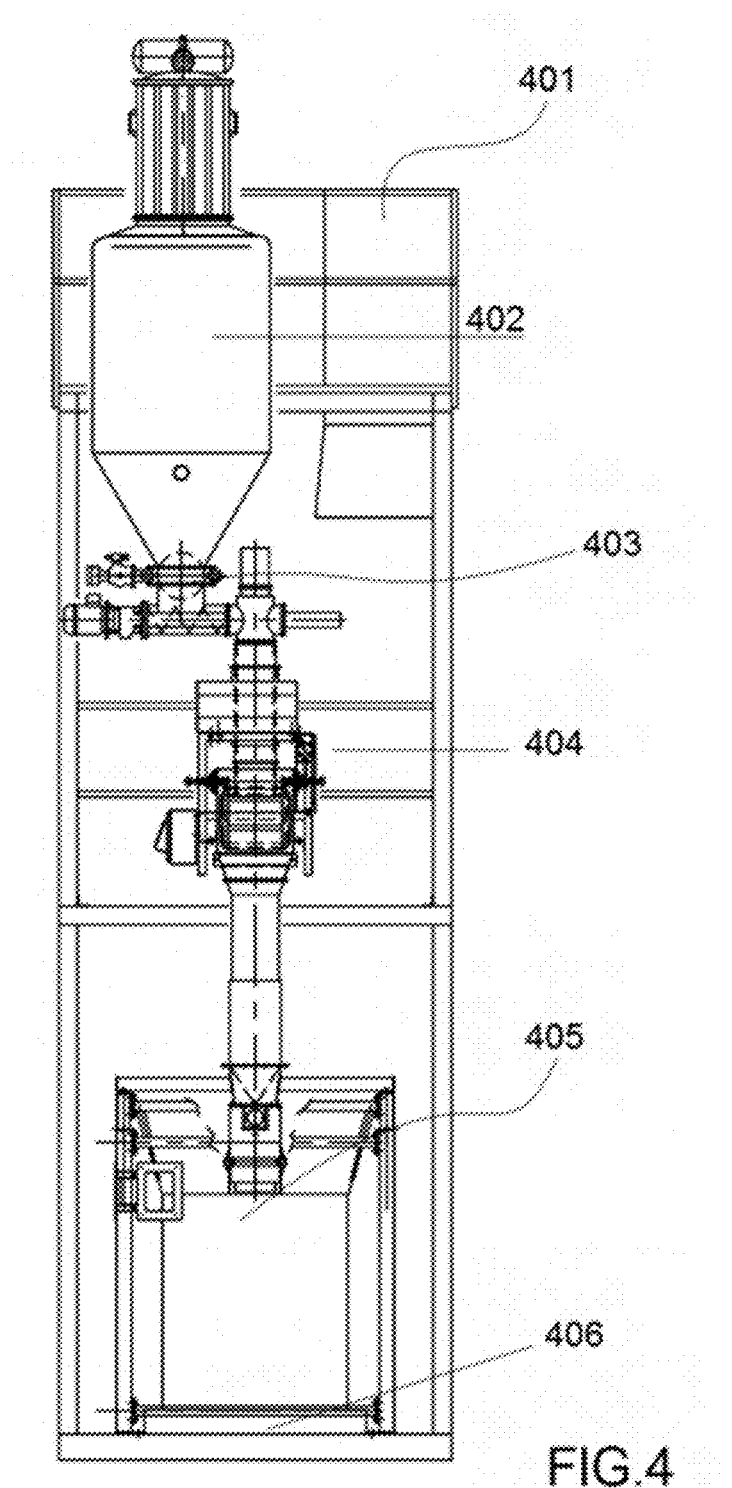
FIG. 4 shows an isolated view of the big bag packaging module that is connected with the mobile mixing plant for powdery products of FIG. 1

In a particular embodiment, the plant of FIG. 1 packaging large bags (best known as big bags) as can be seen in detail in FIG. 4, which allows the packaging module (5) to be able to fill 500 kg to 1000 kg bags. Nevertheless, in some particular embodiments products can be filled in starting from 100 kg bags, and in some embodiments, also 350 or 400 kg bags.

The arrangement of this plant is a horizontal container measuring 20 feet which, once at its destination it will be installed vertically and will be located after the mixing module (4). The big bag module (400) is made up of three blocks which are placed on top of one another vertically and all the installations are connected with quick connect adaptors without requiring in situ installations, because everything is ready to be assembled and with all installations for starting up in one day. The quick connections and electric power are provided from the general distribution board of the plant of FIG. 1.

Therefore, once the mixing of the product in the mixing module (4) has ended, said product goes to the packaging module (5) which, in this embodiment, comprises a system for taking the powder after mixing to the big bag module (400). The capacity to be achieved is approximately 1000 kg/h, depending on the products.

Packaging is done for four or five 200 kg batches combined with one another. The module is designed to be contained and transported in a 20" open top container with all the necessary machinery, auxiliary elements and tools included.

It has been designed to be installed vertically, under cover, protected from the elements, in a ventilated site and located on even ground suitable for the described loads.

This design is established in order to be divided into three blocks of a height of about 2.3 m each (in any case, less than 2.4 m, which is the maximum height of the containers) and so that they can be handled with an electric fork lift during assembly and installation. Suitable transport and operation is thereby assured, in addition to achieving safety and traceability in the process so that staff working at the plant cannot make mistakes and making it easier to following the manufacturing sequence as it has been projected, and implementing the necessary surveillance and control means from the central office.

The big bag module (400) comprises the following elements:
  (a) A structure (401) capable of being introduced in a 20" container without deformations, protecting and providing support for the different machines and auxiliary equipment for carrying out the different processes.
  (b) Reception of the mixed product in a hopper (402) and dosing for packaging.
  (c) Dosing valve (403) installed after the hopper (402) for dosing the already mixed product.
  (d) In-line metal detector (404) with rejection means.
  (e) Bag filling module (405) for filling bags by batches, with labeling and weight control (406).

The production parameters to be achieved are 1 Tm/h in 4 or 5 batches per bag. The times in the different phases are 12 minutes at most, so said cycle at most will continue to be maintained to assure the indicated capacity. For complete certification and combination with an existing plant of mixtures, in this non-limiting example the times will be (they logically may vary according to the desired installation):
  Weighing will be done independently.
  Loading.
    Taking up bags: 1 min.
    Filling: 10 min.
    Connection/disconnection: 1 min.
    Total: 12 minutes.
  Mixing:
    Machine connection: 1 min.
    Mixing: 10 min.
    Disconnection: 1 min.
    Total: 12 minutes
  Lifting the product from mixing to the feed hopper (402) which complies with cycles that allow the goal of assuring 1000 kg/h
  Bag filling:
    Continuously connected with the previous phase, packing must be done with each batch of about 200 kg going through a rotary installation and metal detector until amounting to 4-5 batches, depending on densities.

This operation must be done in 1 hour.

Five container changes (for each batch).

Packaging of these five batches in one bag, going through a rotary installation and metal detector. For each bag, there is weight verification, labeling and withdrawal of the bag, placing an empty back to start a new packaging cycle (60 minutes per cycle of 1000 kg for five batches).

Generally, all the general services of the installation will be connected with those of the plant of FIG. 1.

The invention claimed is:

1. A modular, mobile mixing and packaging plant for powdery or granular products comprising a carrying structure having dimensions suitable for being introduced in a standard maritime container and internally housing a reception and manual weighing module, a material loading module, a mixing module and a packaging module, wherein the plant further comprises an additional liquid injection module insertable and connectable with a control PLC of the modular plant; and wherein the liquid injection module is arranged to dose a liquid amount of any viscosity into a mixing tank of the mixing module and wherein the dosing of the liquid is made by means of a pump with its flow rate controlled by means of a plurality of loading cells in a stirring compartment of the liquid injection module.

2. The plant according to claim 1, wherein the stirring compartment is a cylindrical tank with frustoconical bottom and dual chamber and a heat-insulated outside; and wherein the stirring compartment comprises a plurality of thermal resistors installed inside the dual chamber of the stirring compartment and thermal oil arranged to circulate inside the dual chamber of the stirring compartment; and wherein the thermal oil being further arranged to distribute the heat generated by the thermal resistors.

3. The plant according to claim 2, wherein the stirring compartment has a hygienic gantry where there is supported an anchor scraper with made of white, food-grade plastic and that withstand service temperatures of 60° C. and peaks of up to 100° C.

4. The plant according to claim 2, wherein the stirring compartment comprises at least one cover inclined in the top part.

5. The plant according to claim 4, wherein the stirring compartment comprises an outlet with a bottom sanitary valve; and wherein it also comprises upper openings comprising safety sensors in the at least one cover; and wherein each of the supports of the stirring compartment comprises the loading cells for dosing the liquid.

6. The plant according to claim 2, wherein the thermal oil enters in the dual chamber of the stirring compartment where it heated by means of the thermal resistors; and wherein an outlet for the oil is located in a lower part of the stirring compartment, where there is a gear pump that continuously recirculates the thermal oil while it is hot through an oil circuit.

7. The plant according to any of claim 2, wherein the temperature of the powdery or granular product inside the stirring compartment and the temperature of the thermal oil are controlled by temperature probes.

8. The plant according to claim 1, wherein the pump for dosing of the liquid comprises an inlet connected to a bottom valve of the stirring compartment; and wherein the inlet of, the pump is always below the outlet of the bottom valve.

9. The plant according to claim 1, wherein it further comprises an additional big bag module insertable and connectable with a control PLC of the modular plant; wherein the big bag module comprises: (a) a structure capable of being introduced in a 20" container without deformations; (b) reception of the product mixed in a hopper and dosing for packaging; (c) a dosing valve installed after the hopper for dosing the already mixed product; (d) an in-line metal detector; and (e) a bag filling module for filling bags by batches, with labeling and weight control.

* * * * *